United States Patent
Tobin

(10) Patent No.: US 11,646,563 B2
(45) Date of Patent: May 9, 2023

(54) TRANSFORMER PROTECTOR WITH INTERNAL FAULT DETECTOR

(71) Applicant: S&C Electric Company, Chicago, IL (US)

(72) Inventor: Thomas J. Tobin, Northbrook, IL (US)

(73) Assignee: S&C Electric Company, Chicago, IL (US)

( * ) Notice: Subject to any disclaimer, the term of this patent is extended or adjusted under 35 U.S.C. 154(b) by 75 days.

(21) Appl. No.: 17/524,141

(22) Filed: Nov. 11, 2021

(65) Prior Publication Data
US 2022/0158434 A1  May 19, 2022

Related U.S. Application Data

(60) Provisional application No. 63/115,818, filed on Nov. 19, 2020.

(51) Int. Cl.
*H02H 3/06* (2006.01)
*H02H 7/04* (2006.01)
*H02H 1/00* (2006.01)

(52) U.S. Cl.
CPC .......... *H02H 3/066* (2013.01); *H02H 1/0007* (2013.01); *H02H 7/04* (2013.01)

(58) Field of Classification Search
CPC .... H02H 1/0007; H02H 1/0061; H02H 3/066; H02H 7/04
See application file for complete search history.

(56) References Cited

U.S. PATENT DOCUMENTS

| | | | | |
|---|---|---|---|---|
| 5,078,078 | A * | 1/1992 | Cuk | G01L 19/12 116/272 |
| 9,188,500 | B2 * | 11/2015 | Pezzin | G01L 23/00 |
| 10,605,849 | B2 * | 3/2020 | Pezzin | G01K 5/70 |
| 11,137,312 | B2 * | 10/2021 | Pezzin | G01L 23/02 |
| 2005/0235174 | A1 | 10/2005 | Curt et al. | |
| 2013/0074603 | A1 | 3/2013 | Pezzin et al. | |
| 2017/0133836 | A1 | 5/2017 | Potnis | |

(Continued)

OTHER PUBLICATIONS

IFD "Internal Fault Detector", 2018, Retrieved from the Internet:<https://static1.squarespace.com/static/59cbc56fedaed8aca77fd167/t/5bb50e32e2c483423e3f5d99/1538592306886/IFD-internal-fault-detector-brochure.pdf> (Year: 2018).*

(Continued)

*Primary Examiner* — Jared Fureman
*Assistant Examiner* — Nicolas Bellido

(57) ABSTRACT

A fault detection system that includes a recloser configured to perform a reclosing operation in response to detecting overcurrent, where the recloser includes a communications device for receiving communications signals. The system also includes a transformer having an outer can, a sensor mounted to the can and extending into the can for measuring pressure therein, where the sensor includes a mechanical indicator that extends when overpressure is detected. The transformer further includes a radio mounted to the can and coupled to the sensor, where the radio includes a switch coupled to the mechanical indicator and a transmitter. When the mechanical indicator extends in response to detecting overpressure in the can it causes the switch to close which causes the transmitter to send a signal that is received by the communications device, which prevents the recloser from reclosing.

20 Claims, 2 Drawing Sheets

(56) References Cited

U.S. PATENT DOCUMENTS

| | | | |
|---|---|---|---|
| 2018/0031625 A1* | 2/2018 | Pezzin | G01R 31/52 |
| 2019/0229523 A1 | 7/2019 | Rostron et al. | |
| 2019/0245342 A1* | 8/2019 | Sharon | H02H 7/26 |
| 2020/0191880 A1* | 6/2020 | Pezzin | G01R 31/50 |
| 2020/0321772 A1 | 10/2020 | Groeger et al. | |
| 2020/0393521 A1 | 12/2020 | Bayoumi et al. | |
| 2021/0075212 A1 | 3/2021 | Montenegro et al. | |
| 2021/0215772 A1 | 7/2021 | Mauney | |

OTHER PUBLICATIONS

Vimeo post entitled IFD Internal Fault Detector, posted Nov. 18, 2018 by user "IFD Corporation". Retrieved from Internet: <https://vimeo.com/298492441?embedded=true&source=vimeo_logo&owner=91232902>. (Year: 2018).*

P. Henault, "Detection of internal arcing faults in distribution transformers," IEEE 12th International Conference on Transmission and Distribution Construction, 2011, pp. 1-7. Retrieved from Internet: < https://ieeexplore.ieee.org/stamp/stamp.jsp?tp=&arnumber=6042220>. (Year: 2011).*

International Search Report and Written Opinion for International Application No. PCT/US2021/058919 dated Feb. 3, 2021. (12 pages).

* cited by examiner

TRANSFORMER PROTECTOR WITH INTERNAL FAULT DETECTOR

CROSS-REFERENCE TO RELATED APPLICATION

This application claims the benefit of priority from the U.S. Provisional Application No. 63/115,818, filed on Nov. 19, 2020, the disclosure of which is hereby expressly incorporated herein by reference for all purposes.

BACKGROUND

Field

This disclosure relates generally to a fault detection system that prevents a recloser from reclosing if a fault is detected that is internal to a transformer and, more particularly, to a fault detection system that prevents a recloser from reclosing if a fault is detected that is internal to a transformer, where the system detects overpressure in the transformer and sends a communications signals to the recloser in response thereto.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders that carry the same current, but are 120° apart in phase. A number of three-phase and single phase lateral lines are tapped off of the feeders that provide the medium voltage to a number of distribution lines that each include a distribution transformer, where the voltage is stepped down to a low voltage and is provided to a number of loads, such as homes, businesses, etc. Traditionally, a fuse that is an independent electrical device that is not in communication with other components or devices in the network is provided at the location where the distribution line is tapped off of the lateral line, where the fuse creates an open circuit if an element within the fuse heats up above a predetermined temperature.

Power distribution networks of the type referred to above typically include a number of switching devices, breakers, reclosers, interrupters, etc. that control the flow of power throughout the network. A vacuum interrupter is a switch that has particular application for these types of devices. A vacuum interrupter employs opposing contacts, one fixed and one movable, positioned within a vacuum enclosure. When the interrupter is opened by moving the movable contact away from the fixed contact the arc that is created between the contacts is quickly extinguished by the vacuum. A vapor shield is provided around the contacts to contain the arcing.

Periodically, faults occur in the distribution network as a result of various things, such as animals touching the lines, lightning strikes, tree branches falling on the lines, vehicle collisions with utility poles, etc. Faults may create a short-circuit that increases the load on the network, which may cause the current flow from the substation to significantly increase, for example, many times above the normal current, along the fault path. This amount of current causes the electrical lines to significantly heat up and possibly melt, and also could cause mechanical damage to various components in the substation and in the network.

Fault interrupting devices, for example, single phase self-powered magnetically actuated reclosers that employ vacuum interrupters, are provided on utility poles and in underground circuits along a power line and have a switch to allow or prevent power flow downstream of the recloser. It has become increasingly more popular to replace the traditional fuse with a fault interrupting device at the location where a distribution line is tapped off of a lateral line just before the distribution transformer so as to reduce the number of service calls to replace fuses in response to temporary faults that can be cleared by the fault interrupting device. One of those devices used for this purpose is known as the VacuFuse™ transformer protector, available from S&C Electric Company, Chicago, Ill., USA.

Reclosers and fault interrupters of this type typically detect the current and/or voltage on the line to monitor current flow and have controls that indicate problems with the network circuit, such as detecting a high current fault event. For example, a recloser may employ a Rogowski coil, well known to those skilled in the art, that is wrapped around the power line and measures current flow on the line by means of the voltage that is induced in the coil being proportional to the rate of change of current flow. If such a high fault current is detected the recloser is opened in response thereto, and then after a short delay closed to determine whether the fault is a transient fault. If high fault current flows when the recloser is closed after opening, it is immediately re-opened. If the fault current is detected a second time, or multiple times, during subsequent opening and closing operations indicating a persistent fault, then the recloser remains open, where the time between detection tests may increase after each test. For a typical reclosing operation for fault detection tests, about 3-6 cycles or 50 to 100 ms of fault current pass through the recloser before it is opened, but testing on delayed curves can allow fault current to flow for much longer times, which could cause significant stress on various components in the network.

Some faults are permanent faults that can't be cleared by a reclosing operation, where the fault interrupter remains in an open state until the fault is fixed. One of those types of faults can be an internal fault in a distribution transformer. However, it is also desirable not to perform the reclosing operation to test for the fault if the fault is internal to the transformer. Currently, these types of reclosers and fault interrupters are not able identify that a fault is internal or external to the transformer.

SUMMARY

The following discussion discloses and describes a fault detection system that includes a recloser configured to perform a reclosing operation in response to detecting overcurrent, where the recloser includes a communications device for receiving communications signals and a controller for operating the recloser. The system also includes a transformer having an outer can that encloses a primary coil and a secondary coil, and a sensor mounted to the can and extending into the can for measuring pressure therein, where the sensor includes an indicator that extends when overpressure is detected. The transformer further includes a radio mounted to the can and coupled to the sensor, where the radio includes a switch coupled to the indicator and a transmitter. When the indicator indicates overpressure in the can it causes a response to prevent the recloser from reclosing.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a fault detection system that prevents a recloser from reclosing if a fault is detected internal to a transformer is merely exemplary in nature, and is in no way intended to limit the disclosure or its applications or uses. For example, the discussion below refers to the transformer as being a distribution transformer. However, the fault detection system may be applicable for other types of transformers.

Figure 1:
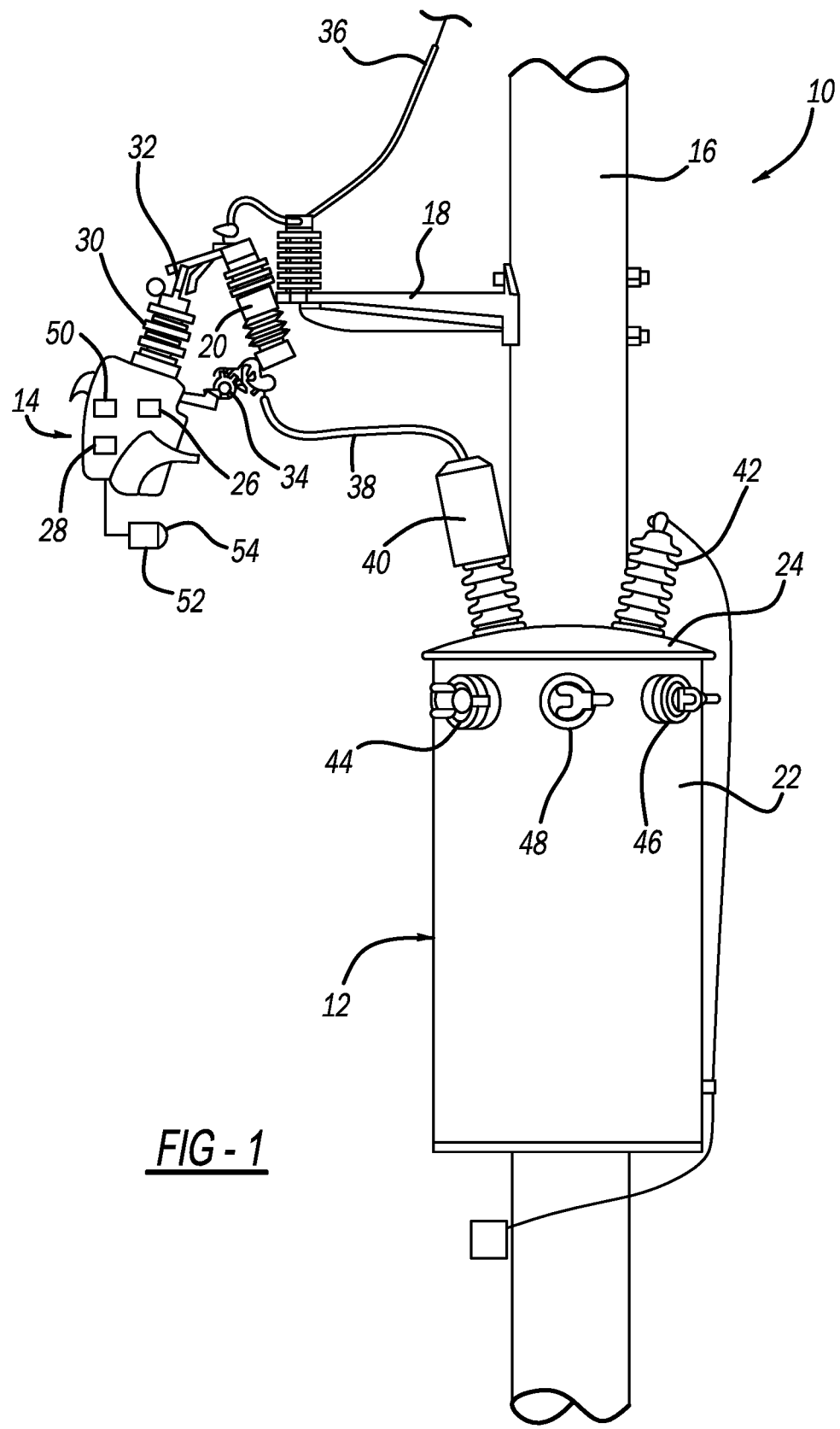
FIG. 1 is an isometric view of a power distribution system showing a distribution transformer and a recloser.

FIG. 1 is an illustration of a power distribution system 10 including a distribution transformer 12 mounted to a utility pole 16 and a cut-out mounted recloser 14 mounted to the utility pole 16 by a mount 18 and an insulator 20. The transformer 12 includes an outer can 22 having a lid 24 typically filled with oil that houses primary and secondary coils (see FIG. 3). The recloser 14 is intended to represent any reclosing or fault interrupting device of the type discussed above, such as a single phase self-powered magnetically actuated recloser that employs a vacuum interrupter, suitable for performing reclosing operations at a location where a power distribution line 36 is tapped off of a lateral line (not shown). The recloser 14 includes a vacuum interrupter 30, a magnetic solenoid and all of the necessary electronics, components and sensors for measuring current, operating the vacuum interrupter 30, harvesting current, processing signals, etc. including a current sensor 50, a controller 26 and a suitable communications device 28 for transmitting and receiving signals. If the recloser 14 performs a reclosing operation and is unable to clear a fault, it will be released from a connector 32 and pivot on a hinge 34 to provide a visual indication that is has operated.

The power distribution line 36 at medium voltage that is tapped off of the lateral line is electrically coupled to one terminal of the recloser 14 and a power line 38 at medium voltage is electrically coupled to the other terminal of the recloser 14 and the primary winding in the transformer 12 through a bushing 40, where the bushing 40 includes an internal conductor and an outer insulation body. An arrester 42 is mounted to the transformer 12 and ground to provide over-voltage protection. The transformer 12 steps down the medium voltage on the line 38 to a lower voltage, and, in this example, provides 120 volt power at a terminal 44 or 46 and a ground terminal 48 and 240 volt power between terminals 44 and 46, where the ground terminal 48 is electrically coupled to a neutral line (not shown) in most applications.

The general configuration of the system 10 is typical, and therefore additional discussion of its structure and function is omitted for brevity.

As discussed above, the recloser 14 measures current and is able to perform a reclosing operation in response to detecting overcurrent from, for example, a fault on the line 38 or within the transformer 12. However, as mentioned above, known reclosers are unable to determine whether a fault is internal or external to the transformer 12, where it would be desirable for the recloser 14 to not perform the reclosing operation if the fault was inside of the transformer 12 because of safety concerns.

In order to address this issue, this disclosure proposes fitting the distribution transformer 12 with an internal fault detector (IFD), which is a known spring actuated, single operation device that is triggered by overpressure that is offered by the IFD Corporation of Vancouver BC, Canada. The IFD is mounted inside of the transformer 12 and pushes a mechanical indicator out if there is a sudden increase in pressure associated with an internal fault. A short-range radio, such as Zigbee or Bluetooth radio, is coupled to the IFD that is turned on by a switch that is actuated by the motion of the mechanical indicator in the IFD. When the IFD detects overpressure, it turns on the radio, which transmits a signal to the communications device 28 inside of the cutout mounted recloser 14. When the recloser 14 receives the signal, it does not perform the reclosing operation and as such would trip and remove the faulted transformer.

The radio includes a power supply that would be powered by the low voltage transformer output and as such power would always be available before the fault occurs when the transformer 12 is energized. The power supply can be design to work over a voltage range of 20 V peak to 200 V peak for use on a 120 V transformer output. This range would allow the power supply to stay energized even when the transformer 12 has some degree of internal fault that depresses the output voltage. Each winding of the transformer 12 can be a source that makes the input power redundant at least from the secondary winding perspective. The power supply would have energy storage in the form of capacitors (film, electrolytic, or super capacitors) so that the radio can be powered for a sufficient time once the recloser 14 opens to clear the fault. It is during this open interval that the radio communications needs to transmit the reclosing blocking signal. For such a short duration, the radio signal can be strong and simple ensuring the transmittal and reception of the blocking signal.

Figure 2:
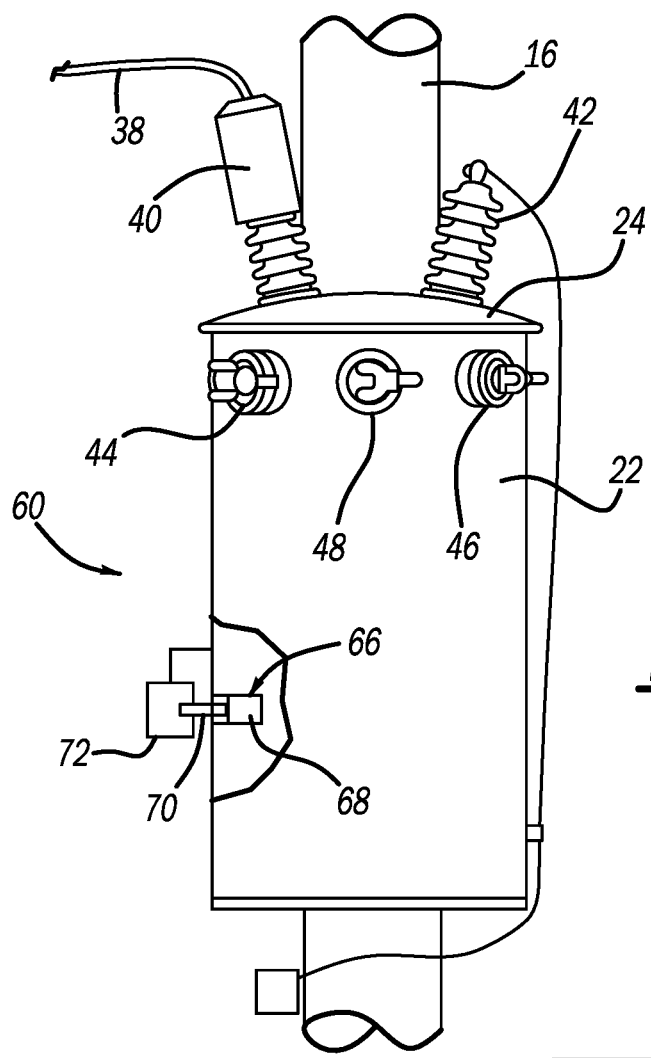
FIG. 2 is a side view of a distribution transformer including an internal fault detector (IFD) and a radio transmitter that can replace the transformer shown in FIG. 1.

FIG. 2 is a depiction of a transformer 60 modified in this manner that can replace the transformer 12, where like elements are identified by the same reference number. Particularly, the transformer 60 includes an IFD 66 mounted to and extending through and into the can 22. The IFD 66 includes a sensor 68 that monitors pressure within the can 22 and if the pressure exceeds a predetermined pressure, which may occur as a result of a fault in the transformer 60, will cause a mechanical indicator 70 to extend. A radio 72 is also mounted to the can 22 and is coupled to the IFD 66 that transmits the blocking signal to the recloser 14.

Figure 3:
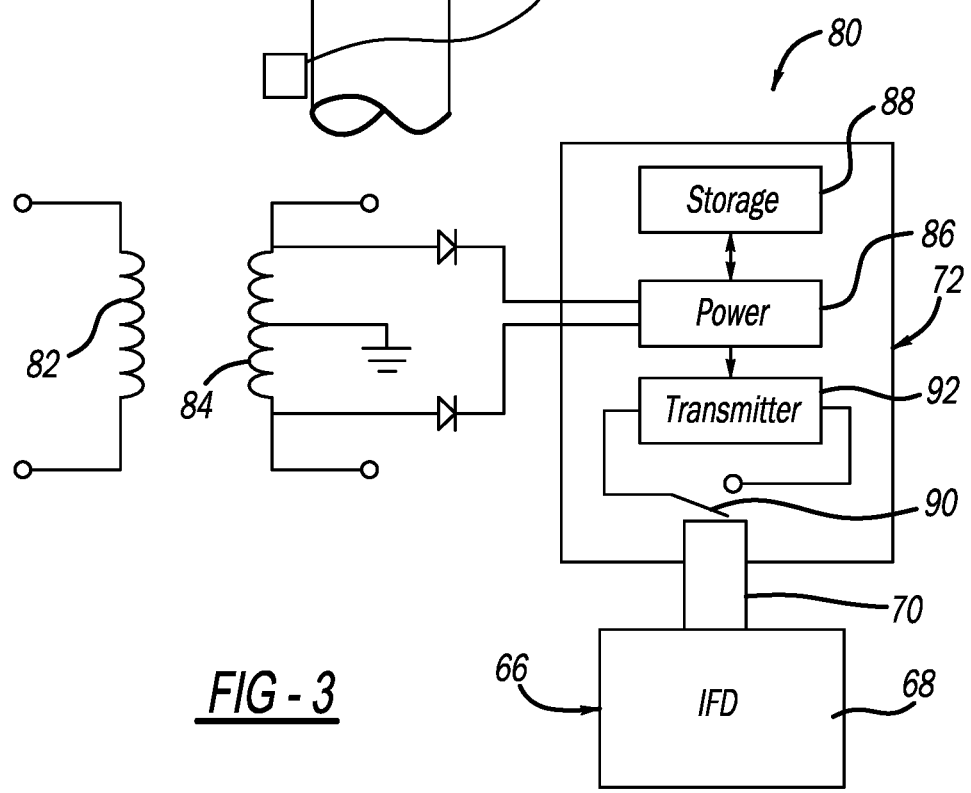
FIG. 3 is a schematic diagram of a fault detection system including the IFD and the radio transmitter and separated from the transformer.

FIG. 3 is a schematic diagram of a fault detection system 80 including the IFD 66 and the radio 72 separated from the transformer 60. The system 80 also includes a primary coil 82 and a secondary coil 84 that would be housed within the can 22, where the radio 72 is powered by a power supply 86 that receives power from the secondary coil 84. A power storage unit 88, such as a bank of capacitors, stores power to operate the radio 72 when the recloser 14 is open and power is not being provided to the transformer 60. The radio 72 includes a switch 90 that is mechanically coupled to the indicator 70 so that when the indicator 70 extends in response to the detection of high pressure, the switch 90 will close, which causes a transmitter 92 to transmit a signal that is received by the communications device 28 in the recloser 14. The device 28 sends a message to the controller 26 and the controller 26 prevents the recloser 14 from reclosing.

The embodiment discussed above employed a technique for determining that a fault is internal to the transformer 60. In another embodiment, a technique is employed for determining that the fault is external to the transformer 12, such as by detecting an arc from the top of the bushing 40 to the can 22 or along the line 38, where if it is determined that the fault is not external to the transformer 12 it is assumed that it is internal to the transformer 12. An electric arc on the outside of the transformer 12 across the bushing 40, from the arrester 42, or from the drop lead to ground, will emit a strong flash of light, an over-pressure wave and/or high-frequency radiation. By providing a simple sensing element in connection with the recloser 14, a fault can be identified that is outside of the transformer 12. The intensity of the arc-flash light is quite high making sensing of the light practical even in outdoor sunlight. The recloser 14 is generally mounted in close proximity to the transformer 12 enhancing the ability to detect the arc flash. Increased sensing reliability to differentiate over high sunlight conditions can be obtained by looking for a sudden change in the light intensity over the average ambient lighting, which can be adjusted as the ambient light changes.

As a non-limiting example, a simple light sensor 52 that is part of the recloser 14 and is directed towards the transformer 12 could detect a bright or sudden flash of light in combination with the detection of overcurrent, where a lens 54 can be provided to expand the field of view of the sensor 52. The light sensor 52 is a known technology and can be powered, monitored and analyzed by the controller 36 inside of the recloser 14 that is responding to the fault overcurrent. If overcurrent trips the recloser 14 and a flash of light is detected by the sensor 52, then the fault is outside of the transformer 12 and the controller 26 allows reclosing. If overcurrent trips the recloser 14 and a flash of light is not detected by the sensor 52, then the fault is assumed to be inside of the transformer 12 and the controller 26 does not allow reclosing.

Other sensors could be utilized as a replacement or supplemental for the light sensor 52. An antenna could sense higher frequency electromagnetic radiation that would be high for external arcs and low for internal arcs. Also, a pressure sensor could detect the overpressure associated with the external arc. It is noted that the sensor 52 is intended to represent any of these various types of sensors and combination of sensors suitable for the purposes discussed herein.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A fault detection system comprising:
a recloser configured to perform a reclosing operation in response to detecting overcurrent, the recloser including a communications device for receiving communications signals and a controller for operating the recloser; and
a transformer including an outer can that encloses a primary coil and a secondary coil, the transformer also including a sensor mounted to the outer can and extending into the outer can for measuring pressure therein, the sensor including an indicator that indicates when overpressure is detected, the transformer further including a radio mounted to the can and coupled to the sensor, the radio including a switch coupled to the indicator and a transmitter, wherein when the indicator indicates the overpressure it causes a response which prevents the recloser from reclosing.

2. The system according to claim 1 wherein the radio further includes a power supply unit and a power storage unit, the power supply unit providing power to the radio when the recloser is closed and the power storage unit providing power to the radio when the recloser is open.

3. The system according to claim 2 wherein the power supply unit is electrically coupled to the secondary coil and receiving power therefrom.

4. The system according to claim 1 wherein the transformer is a distribution transformer that converts medium voltage to low voltage to be delivered to low voltage loads.

5. The system according to claim 1 wherein the radio is a short-range radio.

6. The system according to claim 1 wherein the recloser is a cut-out mounted recloser.

7. The system according to claim 1 wherein the recloser is a single phase self-powered magnetically actuated recloser.

8. The system according to claim 1 wherein the recloser includes a vacuum interrupter.

9. The system according to claim 1 wherein the recloser and the transformer are mounted to the same utility pole.

10. A fault detection system comprising:
a recloser configured to perform a reclosing operation in response to detecting overcurrent, the recloser including a communications device for receiving communications signals and a controller for operating the recloser; and
a distribution transformer that converts medium voltage to low voltage to be delivered to low voltage loads, the transformer including an outer can that encloses a primary coil and a secondary coil, the transformer also including a sensor mounted to the outer can and extending into the outer can for measuring pressure therein, the sensor including a mechanical indicator that extends when overpressure is detected, the distribution transformer further including a radio mounted to the outer can and coupled to the sensor, the radio including a switch coupled to the mechanical indicator, a transmitter, a power supply unit and a power storage unit, the power supply unit providing power to the radio when the recloser is closed and the power storage unit providing power to the radio when the recloser is open, wherein the power supply unit is electrically coupled to the secondary coil and receiving power therefrom, and wherein when the mechanical indicator extends in response to overpressure it causes the switch to close which causes the transmitter to send a signal that is received by the communications device which prevents the recloser from reclosing.

11. The system according to claim 10 wherein the radio is a short-range radio.

12. The system according to claim 10 wherein the recloser is a cut-out mounted recloser.

13. The system according to claim 10 wherein the recloser is a single phase self-powered magnetically actuated recloser.

14. The system according to claim 10 wherein the recloser includes a vacuum interrupter.

15. The system according to claim 10 wherein the recloser and the transformer are mounted to the same utility pole.

16. A method for preventing a recloser from reclosing if a fault is determined to be internal to a transformer, the transformer including an outer can housing a primary coil and a secondary coil, the method comprising:
   detecting overcurrent by the recloser;
   detecting overpressure inside of the outer can housing;
   transmitting a signal to the recloser if the overpressure is detected; and
   preventing the recloser from reclosing in response to detecting the overcurrent and receiving the signal.

17. The method according to claim 16 wherein detecting overpressure inside of the outer can housing includes using an internal fault detector having a mechanical indicator that extends in response to the overpressure.

18. The method according to claim 17 wherein transmitting the signal the recloser includes closing a switch in response to movement of the mechanical indicator.

19. The method according to claim 16 wherein transmitting the signal includes using a radio that is powered by the secondary coil.

20. The method according to claim 16 wherein the transformer is a distribution transformer that converts medium voltage to low voltage to be delivered to low voltage loads.

\* \* \* \* \*